H. E. CONGER & C. W. WALLER.
MEAT SIDING MACHINE.
APPLICATION FILED JAN. 25, 1910.
970,994.
Patented Sept. 20, 1910.
4 SHEETS—SHEET 4.
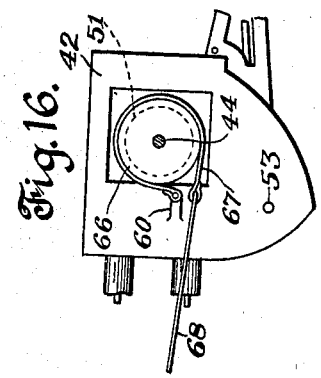
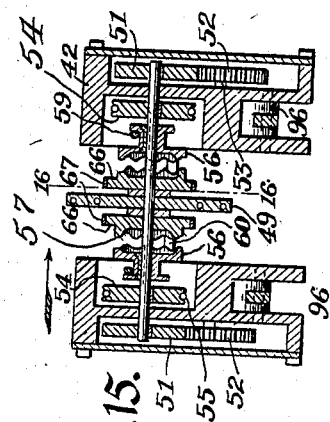
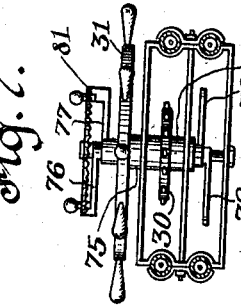
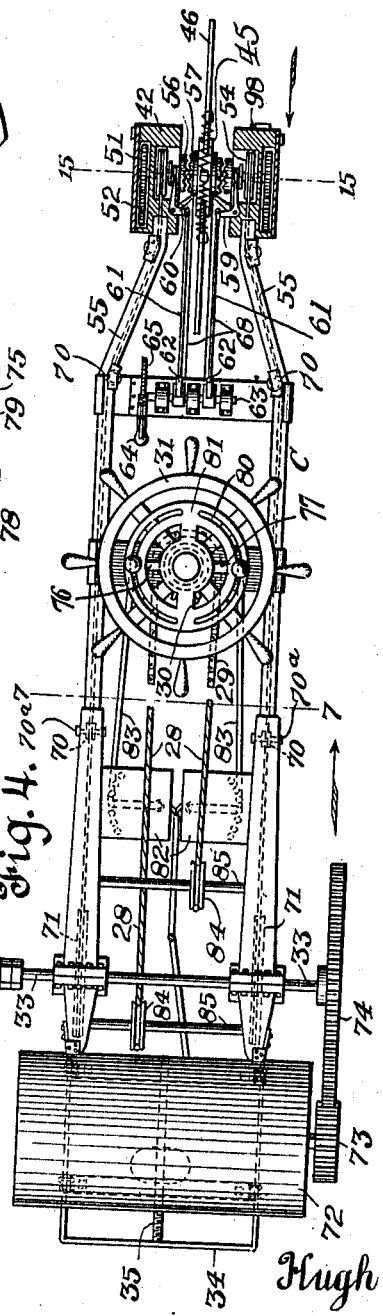
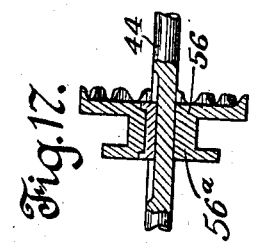
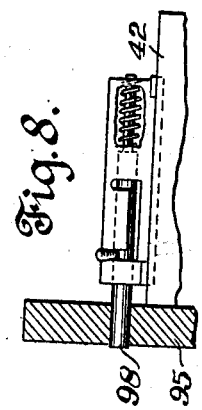
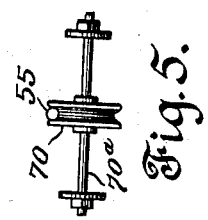
Witnesses
W. S. McDowell
V. B. Hillyard
Inventors
Hugh E. Conger.
Charles W. Waller.
By Victor J. Evans. Attorney

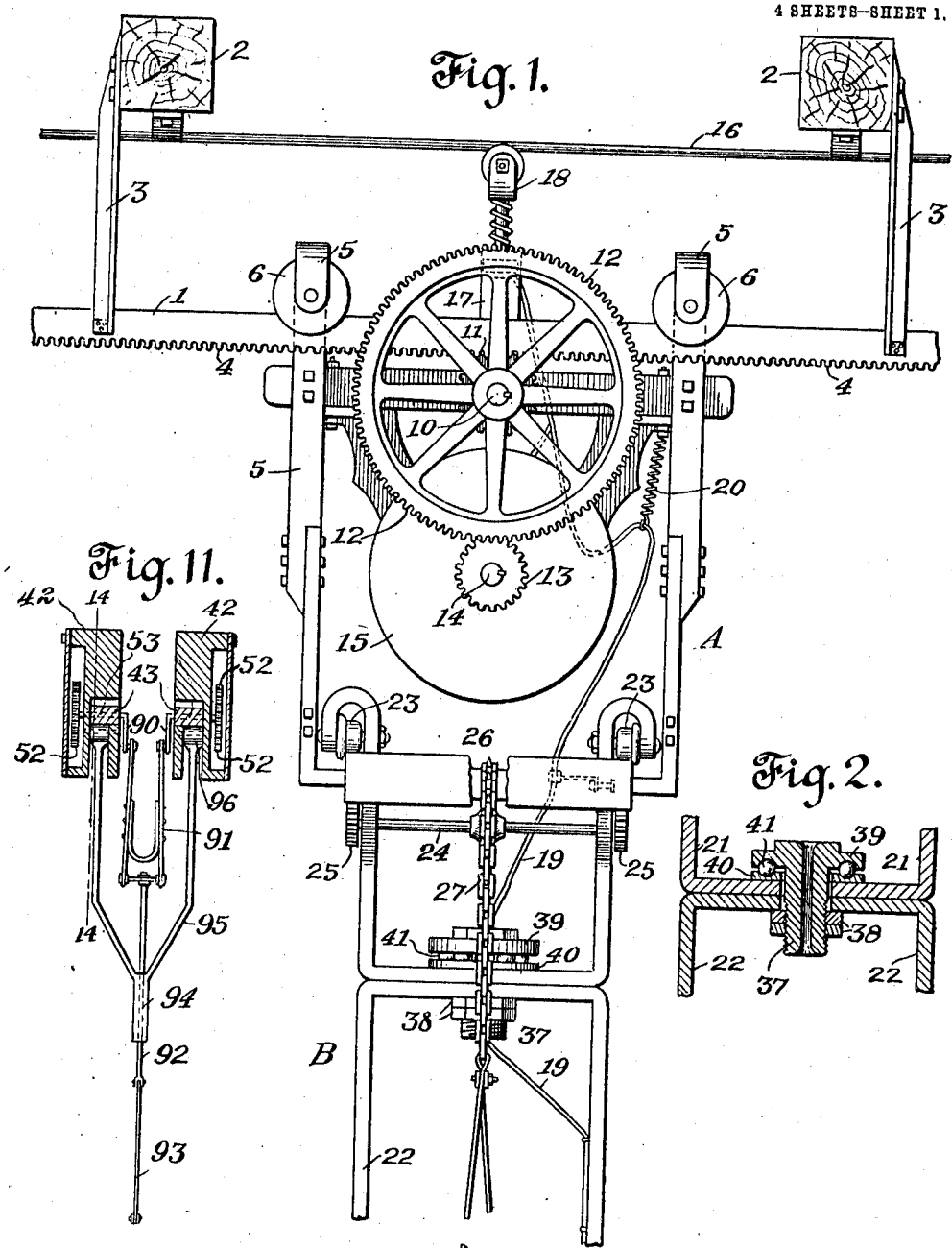

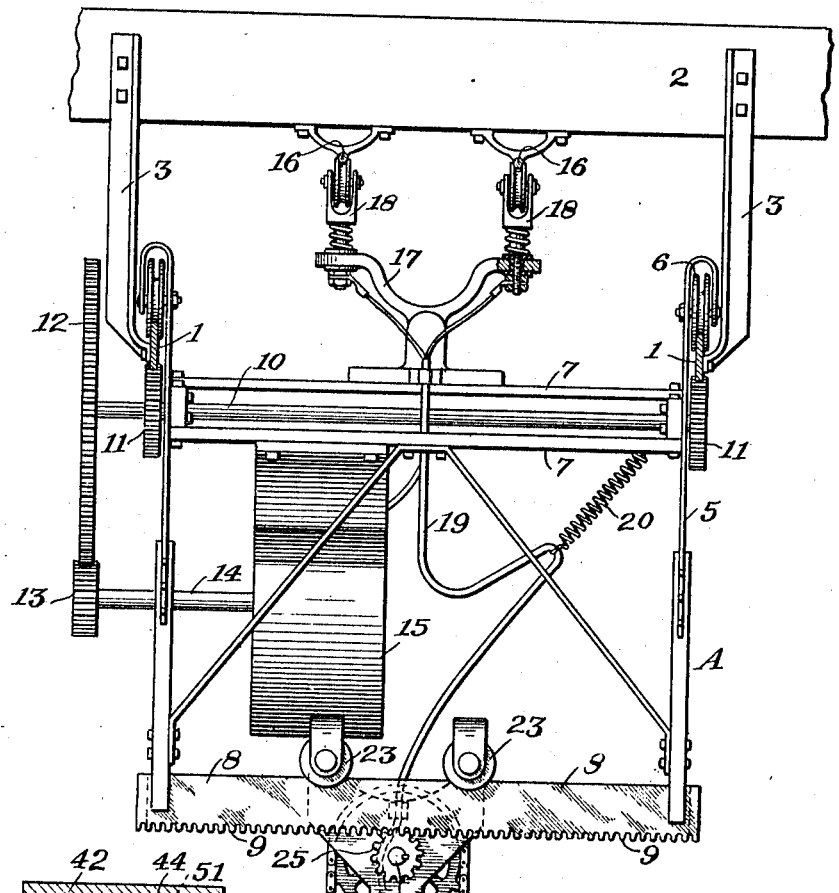
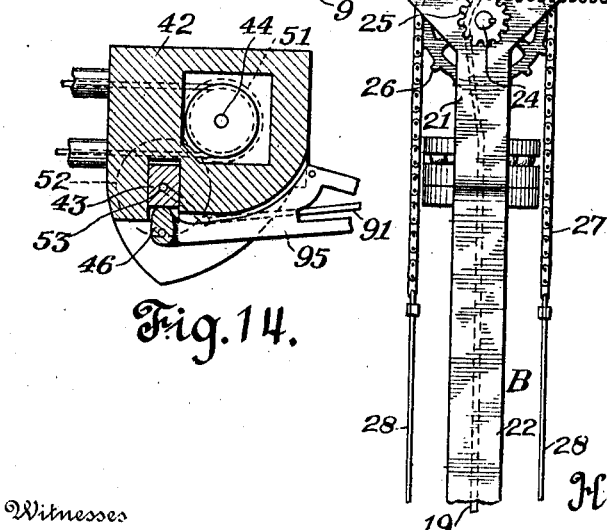

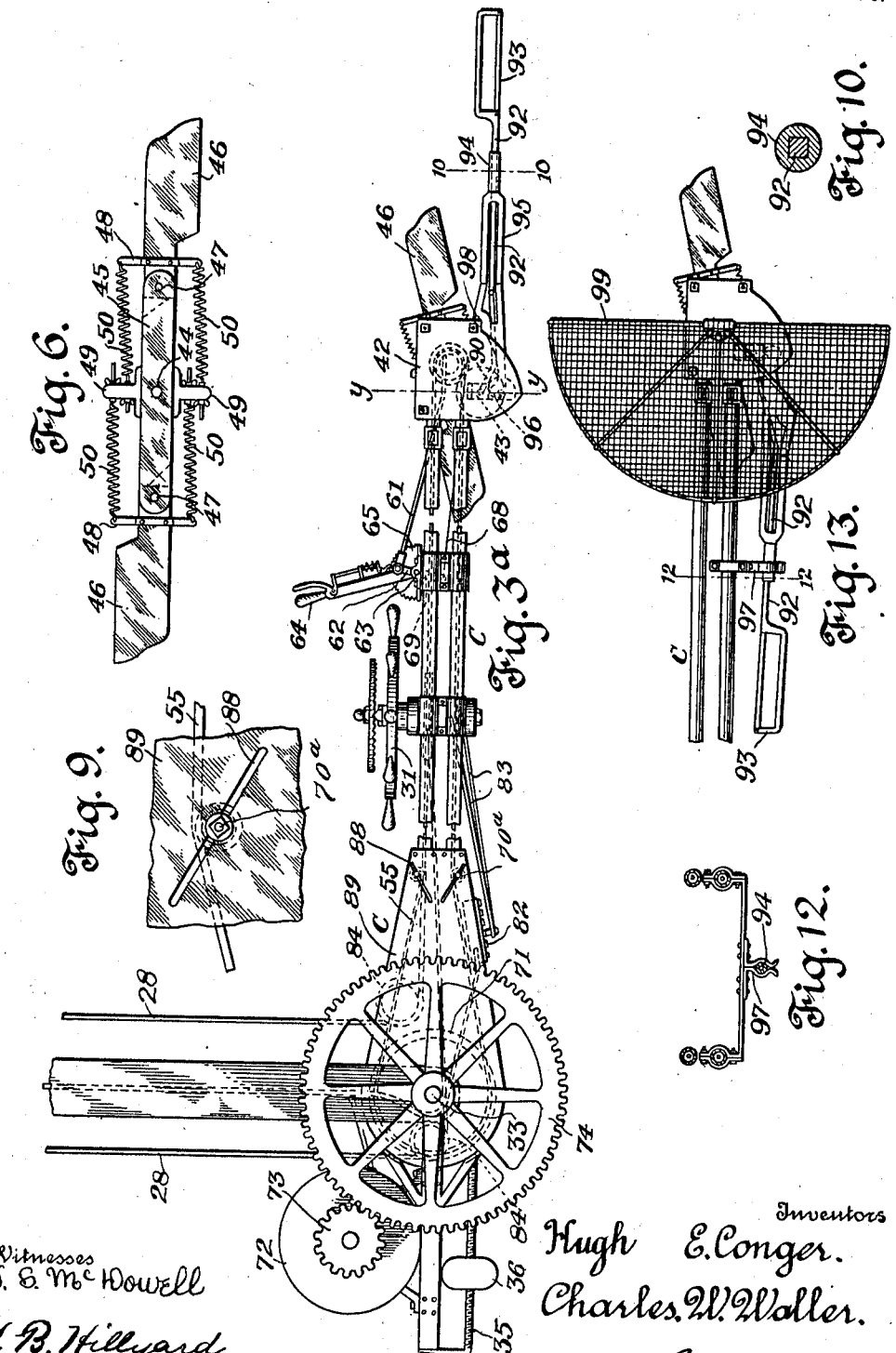

UNITED STATES PATENT OFFICE.

HUGH E. CONGER AND CHARLES W. WALLER, OF CHICAGO, ILLINOIS.

MEAT-SIDING MACHINE.

970,994.                  Specification of Letters Patent.     Patented Sept. 20, 1910.

Application filed January 25, 1910. Serial No. 540,025.

*To all whom it may concern:*

Be it known that we, HUGH E. CONGER and CHARLES W. WALLER, citizens of the United States, residing at Chicago, in the county of Cook and State of Illinois, have invented new and useful Improvements in Meat-Siding Machines, of which the following is a specification.

This invention provides a machine of unique structure, whereby the work of separating or dividing carcasses in the preparation of meat for the market is facilitated, the machine embodying a chopping mechanism in contradistinction to a rotary cutter of the saw type, the latter being objectionable because of the discoloration resulting from its use and attributable to the teeth of the saw drawing the blood to the surface.

The present invention provides a mechanism which is so constructed and counterbalanced as to be easily manipulated by one person, thereby greatly reducing the cost incident to splitting carcasses along the vertebræ so as to provide sides for convenience of handling and transportation.

A further purpose of the invention is to devise a machine particularly adapted for use in slaughter and packing houses to take the place of the generally used cleaver, the chopping mechanism forming the essential part of the machine embodying one or more cleavers arranged to operate by a rotary motion, thereby retaining all the advantages incident to the use of a cleaver for separating carcasses into desired pieces.

A further purpose of the invention is to provide a machine which may be controlled electrically both as to position and in the operation of the several parts, such as the chopping mechanism, the motors and a reciprocating saw, the latter being arranged to be brought into play when a bone of large dimensions is encountered, such as when starting to divide a carcass along the vertebræ. The machine embodies in its organization a carriage arranged to travel upon a track, propelling means under control of the operator for moving the carriage on the track to the desired position, a framework mounted upon the carriage and having a limited movement thereon to enable the chopping mechanism to be properly positioned with reference to the carcass to be cut, and operating devices and power transmitting means admitting of the chopping mechanism being under control of the operator at all times.

The invention consists of the novel features, details of construction and combination of parts, which hereinafter will be more particularly set forth, illustrated in the accompanying drawings, and pointed out in the appended claims.

Referring to the drawings, forming a part of the specification, Figure 1 is a view in elevation of a meat siding machine embodying the invention, a portion of the framework being broken away and the horizontal frame and parts supported thereby being removed. Fig. 2 is a central vertical section of the subjacent portions of the vertical frame, showing the swivel joint formed between them. Fig. 3 is a front view of the upper portion of the machine. Fig. 3ª is a side view of the lower portion of the machine. Fig. 4 is a top plan view of the horizontal frame with the parts mounted thereon, the outer portion of the frame provided with the chopping mechanism being in horizontal section. Fig. 5 is a detail view of one of the guide pulleys and supporting shaft therefor for the drive belt. Fig. 6 is a view in elevation of the chopping mechanism on a larger scale. Fig. 7 is a transverse section on the line 7—7 of Fig. 4, looking in the direction of the arrow, all in front of the hand wheel being omitted. Fig. 8 is a detail view of the means for holding the saw frame in operative position. Fig. 9 is a detail view of a portion of the horizontal frame provided with the adjustable rod carrying a guide and tension pulley for the drive belt which transmits motion to the chopping mechanism. Fig. 10 is a detail section on the line 10—10 of Fig. 3ª. Fig. 11 is a detail view on the line y—y of Fig. 3ª, showing the parts on a larger scale, the saw frame being swung into vertical position. Fig. 12 is a transverse section of the horizontal frame, showing the clip for holding the saw frame when swung out of the way, said section being taken on the line 12—12 of Fig. 13. Fig. 13 is a side view of the chopping mechanism and the outer portion of the horizontal frame, having the saw frame swung out of the way and showing a guard for protecting the operator. Fig. 14 is a section on the line 14—14 of Fig. 11, showing the parts on a larger scale. Fig. 15 is an enlarged section on the line 15—15 of Fig. 4. Fig. 16 is a section on the line 16—16 of Fig. 15, looking to the right. Fig. 17 is a detail view of a portion of the shaft supporting the chopping mechanism, showing the movable clutch member, the latter being in section.

Corresponding and like parts are referred to in the following description, and indicated in all the views of the drawings, by the same reference characters.

The machine is mounted upon over head tracks, which may be supported in any manner and be of any construction. As indicated the track embodies a pair of rails 1, which are suspended from rafters or roof-timbers 2 by means of hangers 3. The rails 1 are toothed along their lower edges, as indicated at 4, to insure positive movement of the machine and to form locking means for holding the same in the required position. The carriage A mounted to travel upon the track may be of any formation and comprises hangers 5, which are provided at their upper ends with grooved wheels 6 arranged to travel upon the rails 1. The carriage embodies side pieces, which are connected at or near their upper and lower ends. Bars 7 connect the upper portions of the side pieces of the carriage and bars 8 connect the lower ends thereof, the latter bars forming in effect a track upon which a pendent frame B is mounted to travel in a direction at a right angle to the movement of the carriage A upon the track 1. The lower edges of the bars 8, forming the rails of the track upon which the frame B is mounted, are toothed, as indicated at 9, to insure positive movement of the means whereby the frame B is moved. A shaft 10 is mounted in the upper portion of the carriage A and is provided at or near opposite ends with pinions 11, which mesh into the teeth 4 of the track rails 1. A spur gear 12 fastened to one end of the shaft 10 meshes with a spur pinion 13 on one end of a power driven shaft 14. The numeral 15 designates a motor from which the shaft 14 derives power and said motor may be of any variety, it being preferred to provide one of the electric type. When the motor 15 is in operation the shaft 10 is rotated by means of the intermediate connections, and by reason of the pinions 11 fastened to the shaft 10 to rotate therewith and meshing with the teeth 4 of the track rails 1, the carriage A is moved upon the track, the direction of travel being determined by the direction of rotation of the shaft 10. The electric motor 15 may be operated by a current led thereto from any source. Electric conducting rails 16 are supported by the rafters or beams 2 and are connected with any source of current supply. A trolley harp 17 is mounted upon the carriage A and is provided with frames 18 supplied with trolley wheels, which are arranged in contact with the conductors 16 so as to take off current therefrom. The frames 18 are yieldably mounted upon arms of the trolley harp 17 and a conductor 19 has connection therewith and conveys the current to the motors. A helical spring 20 supports the loose portion of the conductor so as to hold the same up out of the way.

The pendent frame B consists of an upper section 21 and a lower section 22. The frame B is provided at its upper end with wheels 23, which are arranged to travel upon the rails 8 of the track supported by the carriage A. A shaft 24 is mounted near opposite ends in the side members of the upper portion 21 of the frame and has spur pinions 25 fastened to its projecting ends and arranged to mesh with the teeth 9 of the track rails 8. A sprocket wheel 26 fastened to the transverse shaft 24 receives a sprocket chain 27, which passes thereover. It follows that motion being imparted to the sprocket chain 27 in one direction or the other imparts a corresponding movement to the sprocket wheel 26 and the shaft 24, thereby causing the frame B to move backward or forward upon the track 8. Cords or like connections 28 are connected to opposite ends of the sprocket chain 27 and after passing around suitable guide pulleys are connected to the ends of a sprocket chain 29, which passes around a sprocket wheel 30 fastened to the shaft of a hand wheel 31 mounted upon the outer portion of the horizontal frame C, which is connected at its inner end to the lower portion of the vertical or pendent frame B.

The horizontal frame C is pivotally mounted upon the lower end of the vertical frame B, the latter being provided with journals 32, which pass through openings in the side members of the frame C, said journals 32 being hollow and constituting bearings for a shaft 33. The frame C has a rear extension 34, which is provided with a threaded rod 35, upon which a weight 36 is adjustably mounted, thereby admitting of the frame C being counterbalanced so that it may normally occupy a horizontal position and by having said frame C counterbalanced it may be easily manipulated by the operator. The lower section 22 of the frame B is connected with the upper section 21 so as to turn about a vertical axis and thereby admit of the horizontal frame being moved to any angular position best suited to the work or the relative position of the carcass to be split. A short tube 37 passes through centrally disposed openings in the horizontal portions of the sections 21 and 22 and is headed at its upper end and threaded at its lower end, the latter receiving a pair of nuts 38, whereby the parts are secured when assembled. The head 39 at the upper end of the tube 37 overlaps a plate 40 upon the upper side of the horizontal portion of the section 21, both the head 39 and plate 40 having matching grooves, which form a raceway in which balls 41 are placed, thereby reducing the friction to the smallest amount possible, so that the section 22 may be readily turned to any angular position. The conductor 19 passes through the tube 37 and is prevented from twisting when turning the frame C.

The horizontal frame C may be of any light and substantial construction and comprises side pieces formed of upper and lower members and transverse connecting pieces. Head blocks 42 are provided at the outer end of each side piece of the frame C and support the chopping mechanism and the saw, as well as the operating means therefor. Each of the head blocks 42 is recessed upon opposite sides, the inner recesses receiving bearing blocks 43 and the outer recesses receiving gearing for operating both the chopping mechanism and the saw. A shaft 44 is mounted in the head blocks 42 and receives the chopping mechanism. A bar 45 loosely mounted upon the shaft 44 pivotally supports chopping blades 46, the latter being pivoted thereto at 47. Short bars 48 are secured to the shanks of the chopping blades 46 and project beyond the same. Brackets 49 are secured to the bar 45 and springs 50 connect the ends of the cross bars 48 with said brackets, the tension of the springs 50 being regulable so as to offer more or less resistance to the movement of the chopping blades about their pivotal supports 47. The bar or support 45 constitutes in effect a rotary head to which the chopping blades 46 are pivotally attached. A spur gear 51 is fastened to each end of the shaft 44 and is adapted to mesh with a spur gear 52 fastened to the outer end of a shaft 53, which is mounted in each of the blocks 43. A pulley 54 is secured to each end of the shaft 44 and is grooved to receive a drive belt 55. A clutch member 56 is keyed upon the shaft 44 to rotate therewith but is free to have a limited longitudinal movement thereon. A clutch member 57 is provided upon each side of the rotary head 45 and is adapted to coöperate with the clutch member 56 to secure the rotary head to the shaft 44 when the chopping mechanism is required to be set in operation.

It is to be understood that each end portion of the shaft 44 is similarly equipped. A bell crank 59 is mounted upon each head block 42 and each of said head blocks is provided with an arm 60. One member of the bell crank 59 coöperates with the annularly grooved hub 56ª of the clutch member 56, so as to positively move the latter when the bell crank 59 is operated. The other member of the bell crank 59 is connected by means of a rod 61 with an arm 62 secured to a shaft 63, which latter is provided with an operating lever 64 having a hand latch to coöperate with a toothed segment 65 to secure the operating lever 64 and attached parts in the desired adjusted position. The clutch members 57 are provided upon the outer sides of pulleys 66, which constitute brake members. Brake bands 67 coöperate with the brake pulleys 66 and have connection at one end with the arms 60 and at their opposite ends with rods 68, which extend to arms 69 projecting from the shaft 63, whereby both the clutch members 56 and the brake mechanism 66 and 67 are operated simultaneously, the one being thrown into action when the other is thrown out of action. When the lever 64 is moved to throw the clutch members 56 out of engagement with the clutch members 57 the brake bands 67 are simultaneously tightened about the brake pulleys 66, thereby holding the chopping mechanism inactive. The drive belts 55 after passing around the pulleys 64 are directed by guide pulleys 70 applied to the main frame C and derive power from pulleys 71 secured to the shaft 33, the latter in turn being driven from a motor 72 mounted upon the rear portion of the frame C, the motor shaft having a spur gear 73 which meshes with a spur gear 74 fastened to an extension of the shaft 33.

The hand wheel 31 is located near the outer end of the frame C near the operating lever 64, so that the controlling parts may be accessible from a given point. The shaft 75 of the hand wheel 31 is hollow and receives other shafts which pass therethrough and are provided at their upper ends with cranks 76 and 77 and at their lower ends with cranks 78 and 79. The cranks 76 and 77 are provided with operating pieces, which pass through semicircular slots 80 of a wheel 81, the latter being notched to coöperate with the operating pieces of the crank arms 76 and 77 to hold the same in an adjusted position. Rheostats 82 are provided for the electric conductors, one for each motor, said rheostats also admitting of the circuits being reversed or modified according to the result to be attained. Rods 83 connect the crank arms 78 and 79 with the switch blades of the rheostats 82 so that the motors may be independently controlled, it being understood that one crank arm 76 controls one of the motors and the other crank arm 77 the other motor. When the hand wheel 31 is rotated the cords or like connections 28, 27 and 29 are moved, thereby causing the shaft 24 to rotate and effect a shifting of the frame B backward or forward upon the track 8, so as to position the chopping mechanism to the work in hand. The cords or like connecting means 28 pass around guide pulleys 84 mounted on rods 85 which in turn are mounted in the frame C in any manner.

Cranks 90 are provided at the inner ends of the shafts 53 and are connected by means of a pitman frame 91 to the inner end of a rod or bar 92 of a saw 93, whereby the latter is reciprocated when in operation. The rod or bar 92 passes through a tubular guide 94 at the outer end of a swinging frame 95, which is forked and has its forked members pivoted to the head blocks 42. A cam 96 is provided upon the inner end of each fork member of the frame 95 and is adapted to engage the lower end of a bearing block 43 to effect movement thereof. When the frame 95 is swung upwardly and forwardly to bring the saw 93 into operative position, as shown in Fig. 3ª, the cams 96 move the blocks 43 upward and support the same in elevated position, thereby holding the spur gears 52 in mesh with the spur gears 51, whereby the saw is operated from the shaft 44. When the frame 95 is swung rearwardly, as indicated in Fig. 13, the cams 96 are withdrawn from beneath the bearing blocks 43 and the latter dropping carry the spur gears 52 away from the spur gears 51, thereby throwing the saw out of action. When the saw 93 is swung to a position to be out of the way, as indicated in Fig. 13, it is held by means of a spring clip 97, which is secured to a cross bar clip or otherwise secured to the side pieces of the frame C. When the frame 95 is swung into operative position it is retained in place by means of a bolt 98 mounted upon a head block 42 engaging an opening in the frame 95 near its inner end. The saw is required at times for cutting through a larger bone, such as found near the rump of a carcass and required to be cut through preliminary to the splitting of the carcass along the vertebræ.

In the operation of the invention the parts being assembled substantially as herein stated movement of one of the crank arms 76 or 77 closes the circuit including the electric motor 15 with the result that the carriage A travels upon the track 1 and when the machine reaches the desired position the crank arm previously operated is moved to shut off the current, thereby fixing the position of the mechanism by reason of the interlocking of the teeth of the pinions 11 with the teeth 4 of the track rails 1. Movement of the hand wheel 31 in one direction or the other will cause the vertical frame B to travel upon the track 8 of the carriage A to advance the chopping mechanism or to move said chopping mechanism backward as may be required. After the chopping mechanism has been properly positioned the same is set in motion by operating the other of the crank arms 76 or 77, whereby the circuit including the motor 72 is closed. As the shaft 44 is rotated the chopping blades 46 are carried around in a circular path and by reason of their peculiar mounting the chopping blades are adapted to yield slightly at the instant of delivering the blow. The chopping mechanism may be thrown out of action without stopping the motor 72 by operating the lever 64, which throws the clutch members 56 outward and at the same time brings the brake mechanism into play so as to hold the chopping mechanism against movement. Should it be required to use the saw for cutting through a large bone the frame 95 is swung into operative position and secured by the bolt 98 and as the frame 95 swings into operative position the cams 96 at the same time move the bearing blocks 43 upward in the head blocks 42, thereby bringing the spur gears 52 and 51 into meshing relation, whereby the saw is operated in the manner stated. To prevent injury to the operator a guard 99 is fitted to the outer portion of the frame C, as indicated most clearly in Fig. 13.

The horizontal frame C is provided near its inner end with side plates 89, in which are formed inclined slots 88, the latter receiving the ends of rods 70ª, which support guide pulleys 70 for the drive belts 55. Adjustment of the rods 70ª in the inclined slots 88 serves to regulate the tension upon the drive belts so as to prevent any slipping thereof.

From the foregoing description, taken in connection with the accompanying drawings, the advantages of the construction and of the method of operation will be readily apparent to those skilled in the art to which the invention appertains, and while we have described the principle of operation of the invention, together with the device which we now consider to be the embodiment thereof, we desire to have it understood that the device shown is merely illustrative, and that such changes may be made when desired as are within the scope of the claims appended hereto.

Having thus described the invention what is claimed as new, is:—

1. In a meat cutter of the character described, the combination of a track, a frame mounted upon the track and provided with cutting mechanism, a motor mounted upon the frame, gearing between said motor and track for effecting movement of the frame, a second motor mounted upon the frame, connecting means between the second motor and cutting mechanism for actuating the latter, and controlling means for throwing either of the motors into operation for effecting movement of the frame or the cutting mechanism.

2. In a meat cutter of the character specified, the combination of a track, a frame mounted upon the track, a motor mounted upon said frame, connecting means between the motor and track to effect movement of the frame, a second frame mounted upon the first mentioned frame and movable with reference thereto, cutting mechanism mounted upon said second frame, a motor likewise mounted upon the second frame, connecting means between the last mentioned motor and the cutting mechanism, and controlling means mounted upon the second frame and adapted to throw either one or both of the motors into operation for effecting independent or simultaneous movement of the first mentioned frame and the cutting mechanism.

3. In a meat cutter of the character substantially as set forth, the combination of a track, a frame mounted upon the track and comprising upper and lower sections connected by means of a swivel joint, operating means between the track and upper section of the frame to effect positive movement of the frame upon the track, actuating means mounted upon the lower section of the frame and having connection with the operating means to effect movement of the frame when required, cutting mechanism carried by the lower section of the frame, a motor for the cutting mechanism, and means carried by the lower section of the frame to throw the motor into or out of action.

4. In a meat cutter the combination of a track, a frame mounted upon the track and comprising upper and lower sections connected by means of a swivel joint, operating means between the frame and track to effect positive movement of the frame, actuating means for said operating means carried by the lower section of the frame, a cutting mechanism, a motor for the cutting mechanism carried by the lower section of the frame, and controlling means for said motor.

5. In combination a track, a frame mounted to travel upon the track and comprising upper and lower sections which are connected by means of a swivel joint, an approximately horizontal frame pivotally connected with the lower section of the first mentioned frame to turn therewith and to move in a vertical plane at any angular position, cutting mechanism mounted upon the horizontal frame, a motor, connecting means between said motor and cutting mechanism for actuating the latter, and controlling means mounted upon said horizontal frame for bringing the operating mechanism into play for positively moving the first mentioned frame upon the track.

6. In a meat cutter of the character described, a vertical frame comprising upper and lower sections, means for suspending the frame by the upper section, a cutting mechanism mounted upon the lower section, an electric motor mounted upon the lower section and adapted to operate the cutting mechanism, a tube forming a swivel connection between the two sections, said tube having a head, and anti-friction bearings between the head of the tube and the part opposite said head, the tube forming a passage for the conductor by means of which current is supplied to the motor.

7. In a meat cutter of the character described, the combination of a track, a frame mounted to travel upon the track, the latter having a portion toothed, a shaft mounted upon the frame and having a spur gear in mesh with the toothed portion of the track, a hand wheel, connecting means between the hand wheel and shaft to admit of turning the latter to cause movement of the frame upon the said track, cutting mechanism mounted upon said frame, a motor, power transmitting means between the motor and cutting mechanism, and means mounted upon the frame for throwing the motor into or out of operation.

8. In a meat cutter of the character described, the combination of a track having a toothed portion, a frame mounted to travel upon the track and comprising upper and lower sections connected by means of a swivel joint, a cutting mechanism mounted upon said frame, a motor mounted upon the frame, a shaft provided with a pinion in mesh with the toothed portion of the track, a hand wheel, connecting means between said hand wheel and shaft for operating the latter to effect movement of the frame upon the track when required, and motor controlling means mounted upon said hand wheel for stopping, starting or modifying the action of the motor.

9. A meat cutter comprising a carriage, a supporting track therefor, a vertical frame mounted upon the carriage to travel thereon at a right angle to the movement of the carriage, a horizontal frame having pivotal connection with the vertical frame and provided with cutting mechanism, means for counterbalancing the horizontal frame, a motor mounted upon the horizontal frame and adapted to operate the cutting mechanism, and means mounted upon the horizontal frame and adapted to be operated to effect a movement of the vertical frame upon said carriage.

10. In a meat cutter, the combination of a shaft, a rotary head mounted loosely upon the shaft and provided with a cutter and having clutch members upon opposite sides, drive pulleys fastened to opposite end portions of the shaft, clutch members keyed to the shaft to rotate therewith and free to move thereon, an operating lever, and connecting means between said operating lever and clutch members to operate both simultaneously.

11. In a meat cutter, the combination of a shaft, a cutter mounted loosely upon the shaft and provided with a brake pulley, means for imparting rotary movement to the shaft, a clutch member mounted upon the shaft to rotate therewith and to move thereon, a brake element arranged to coöperate with the brake pulley, an operating lever, and connecting means between the operating lever and brake element and clutch member, whereby when said clutch member is in engagement with the cutter the brake element is out of action, and whereby when the clutch member is out of action the brake element is in operation.

In testimony whereof we affix our signatures in presence of two witnesses.

HUGH E. CONGER.
CHARLES W. WALLER.

Witnesses:
JAMES GARDNER,
GEORGE D. YOUNG.